United States Patent [19]
Justice

[11] 4,320,498
[45] Mar. 16, 1982

[54] AUTO BALANCING DUPLEXER FOR COMMUNICATION LINES

[75] Inventor: Gregory Justice, Los Altos, Calif.

[73] Assignee: Apple Computer, Inc., Cupertino, Calif.

[21] Appl. No.: 120,134

[22] Filed: Feb. 11, 1980

[51] Int. Cl.³ .............................................. H04B 1/58
[52] U.S. Cl. ...................................... 370/27; 370/32; 179/170 NC
[58] Field of Search ............................. 370/27, 24, 32; 179/170 NC

[56] References Cited
U.S. PATENT DOCUMENTS 3,993,867 11/1976 Blood ..................................... 370/27
4,238,850 12/1980 Vance ..................................... 370/27

Primary Examiner—Douglas W. Olms
Attorney, Agent, or Firm—Blakely, Sokoloff, Taylor & Zafman

[57] ABSTRACT

A circuit for generating a control signal for use in a communication line duplexer or other isolation means. The transmitted signal at the output of the duplexer is phase detected to detect its real and imaginary components. These components are used to modulate the transmitted signal which is then injected into a feedback loop of the duplexer. This substantially cancels the transmitted signal at the output of the duplexer. The circuit permits the communication line to be terminated in a constant impedance.

17 Claims, 3 Drawing Figures

AUTO BALANCING DUPLEXER FOR COMMUNICATION LINES

BACKGROUND OF THE INVENTION

1. Field of the Invention

The invention relates to isolation means particularly those employed on bidirectional telephone or communication lines for isolating the transmitted signal from the received signal.

2. Prior Art

In recent years, because of judicial and regulatory decisions, many companies are now manufacturing equipment which connects directly to the public telephone network in the United States. The equipment so connected must meet certain specifications, for example, those involving isolation and impedance matching.

One of these requirements which is particularly significant for modulator/demodulator units (modems) is that the telephone line must be terminated in a constant impedance. Typically, in the United States, this impedance is 600 ohms resistive with little or no reactive components. This impedance is, at least in theory, equal to the line impedance. However, in practice, the line impedance is seldom 600 ohms and often contains a reactive component (capacitive or inductive) which varies between 100 ohms to 1.2k ohms.

A duplexer is generally used to separate or isolate the transmitted signal from the signal received on the bidirectional telephone lines. In FIG. 1, a typical duplexer is shown within the dotted line 46 and will be discussed along with the improvement to the duplexer provided by the present invention.

In modems and other devices, transmission and reception frequently occur at the same time when they are used in full duplex mode. Since the transmitted signal is generally substantially larger than the received signal, circuitry must be provided to prevent the transmitted signal from being detected as the received signal or interfering with the proper detection of the received signal. By way of example, 300 baud modems in the answer mode transmit at 2025 Hz to 2225 Hz and receive at 1070 Hz to 1270 Hz. In the originating mode, they transmit at 1070 Hz to 1270 Hz and receive at 2025 Hz to 2225 Hz. These frequency bands are relatively close, making it difficult to provide complete isolation. When the line impedance is 600 ohms, and the duplexer terminates the line in 600 ohms, the duplexer provides satisfactory isolation in conjunction with reasonable bandpass filters. However, in practice, because of the variations in line impedance, a duplexer may only provide 10 db or less of isolation, thus increasing the amount of filtering required as described below.

Filters are typically used to provide further isolation. These filters limit the bandwidth of the transmitted frequency, and likewise, limit the bandwidth of the received signal. However, unless quite expensive filters are used, the "skirts" of these filters overlap, thus in some cases some of the transmitted signal passes through the filters (and duplexer) to the receiver where it may be detected as a received signal or interfere with the proper detection of the received signal.

The problem of compensating for telephone line impedance fluctuations is an old problem, and numerous circuits have been proposed to compensate for such impedance variations. The prior art known to Applicant does not provide the terminating of the telephone line in a constant impedance. In some cases, a conjugate match to the line is made; obviously in these cases the line is not terminated in a pure resistive load (e.g., 600 ohms). The prior art known to Applicant is U.S. Pat. Nos. 4,103,118; 4,096,362; 3,982,080; and 3,178,521. Other related art which uses a passive network and manual balancing is described in U.S. Pat. Nos. 3,496,292 and 2,186,006.

As will be seen, the present invention provides an improved duplexer which includes a circuit for compensating for line impedance variations. The line is terminated in a pure resistive load with the described invention. With the use of the present invention less expensive filters may be employed, by way of example, in modems, since better isolation is obtained from the duplexer.

SUMMARY OF THE INVENTION

A circuit for providing a control signal for an isolation means to automatically reduce the magnitude of the transmitted signal at the receiver in the event of line impedance variations, is described. The circuit is particularly useful in a telephone communications system employing the isolation means in connection with a bidirectional telephone line.

A phase detection means detects the real and imaginary components of the transmitted signal which appear at the received signal output of the isolation means. This phase detection uses the transmitted signal as a reference signal. The output of the phase detection means is coupled to a modulation means. The modulation means modulates the real and imaginary components derived from the transmitted signal, to provide a control signal for the isolation means. The control signal provides substantial cancellation of the transmitted signal at the output of the isolation means.

DETAILED DESCRIPTION OF THE INVENTION

A circuit for providing automatic cancellation of the transmitted signal at the output of a duplexer is described. In the following description, numerous specific details, such as specific circuit components, are set forth to provide a thorough understanding of the present invention. It will be understood by one skilled in the art, however, that the invention may be practiced without these specific details. In other instances, well-known circuits are shown in block diagram form in order not to obscure the present invention in unnecessary detail.

Figure 1:
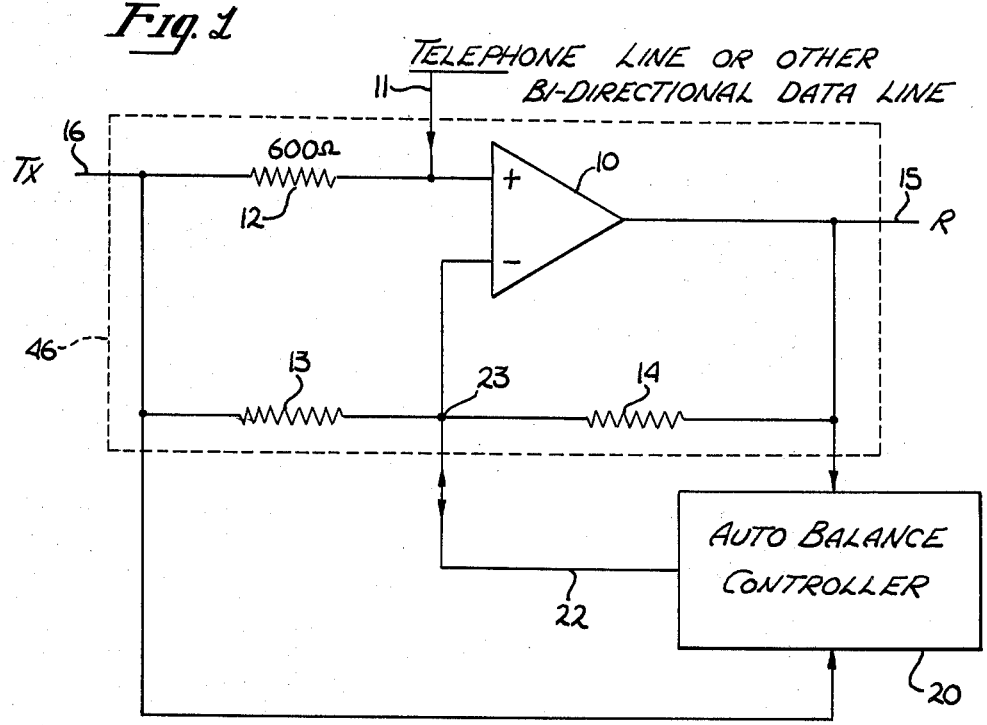
FIG. 1 is a general block diagram of the present invention illustrating its coupling to a duplexer.

Referring to FIG. 1, a prior art duplexer (enclosed within dotted line 46), comprising the differential amplifier 10 and resistors 12, 13, and 14 is illustrated. The bi-directional telephone line 11 is connected to one input terminal of the amplifier 10. The output of the amplifier provides the received signal on line 15. This received signal is coupled to resistors 13 and 14 and provides a feedback signal to the amplifier from node 23. The transmitted signal, $T_x$, (line 16) is coupled to the telephone line 11 and the non-inverting input of the amplifier 10 through the resistor 12. In the United States the resistor 12 is typically 600 ohms, and it provides the termination resistance for the line 11. (The amplifier driving line 16 has a very low output impedance and may be considered a voltage source, the amplifier 10 a very high input impedance, thus line 11 is terminated in a pure resistive load of 600 ohms. The resistors 13 and 14 are of equal value, thus one-half of the output signal on line 15 is fed back to the amplifier 10. Moreover, one-half of $T_x$ is coupled to the inverting terminal of amplifier 10 through these resistors. However, the resistors 13 and 14 may be unequal if more or less gain in the receive channel is desired, without affecting the automatic balancing.

Assume that the line impedance is precisely 600 ohms (resistive). For this case, precisely one-half of the transmitted signal is coupled to the non-inverting input terminal of the amplifier 10. The resistors 13 and 14 also divide this transmitted signal in half, and this divided signal is coupled to the inverting input terminal of amplifier 10. For these conditions the difference signal between the inputs of amplifier 10 is zero, thus none of the transmitted signal appears on line 15. The received signal from line 11 is amplified by the amplifier 10 and coupled to line 15. (One-half of this signal is fed back into the inverting input terminal of amplifier 10.) Therefore, when the line impedance is equal to the resistance of resistor 12, transmission and reception can simultaneously occur without the transmitted signal being sensed on line 15.

If the line resistance is other than 600 ohms, the balanced bridge condition described above is not met and some of the transmitted signal will appear on line 15. One way of correcting this imbalance is to dynamically change resistor 12 to match the line impedance. This implies that both the resistive and reactive components of the line impedance be conjugatively matched by a variable impedance replacing resistor 12. This, however, cannot be done if the requirement to terminate line 11 in a constant resistive load is to be met.

With the present invention, the component of transmitted signal due to line impedance mismatch which appears on line 15 is compared with the transmitted signal on line 16 within the automatic balance controller 20. The results of this comparison are used to generate an AC current whose magnitude and phase are of the proper values such that when it is injected into node 23 it effectively cancels the residue of the transmitted signal present on line 15.

Figure 2:
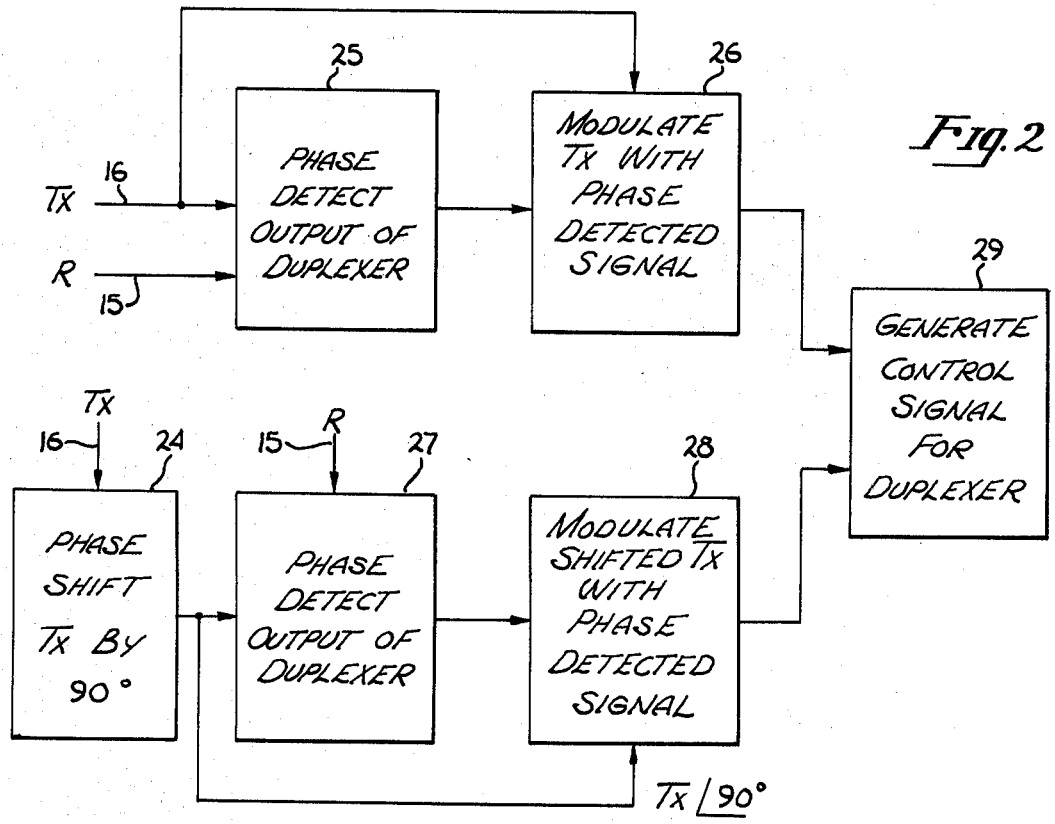
FIG. 2 is a series of blocks illustrating the method by which the present invention controls the residue of the transmitted signal at the received signal output port of the duplexer.

Before describing the presently preferred embodiment of the present invention, reference is made to FIG. 2 to describe the method implemented by the present invention. Block 25 illustrates that the component of transmitted signal appearing on line 15 is phase detected with reference to the transmitted signal (line 16). This, in effect, yields a DC value which represents the real component of the residue of the transmitted signal. This DC voltage then modulates the amplitude of the transmitted signal (block 26).

The transmitted signal (line 16) is also shifted in phase by 90° as indicated by block 24. This phase shifted signal is then used to detect the imaginary component of the transmitted signal present in the transmitted signal residue on line 15 (R) as indicated by block 27. The resulting DC voltage which represents the imaginary component of the residual transmitted signal on line 15, is used to modulate the phase shifted transmitted signal (block 28).

The results of the modulation are used to generate a control signal for the duplexer as indicated by block 29. This control signal, in the presently preferred embodiment as indicated in FIG. 1, is injected into the feedback loop associated with the duplexer, that is, into the bridge network, i.e., at node 23.

The mathematical analysis necessary to show that the phase detection of the real and imaginary components, along with the modulation, yields a signal which will cancel the effects of the transmitted signal at the output of the duplexer is extremely complicated. This analysis is not presented here since it is not necessary to practice or understand the present invention.

Figure 3:
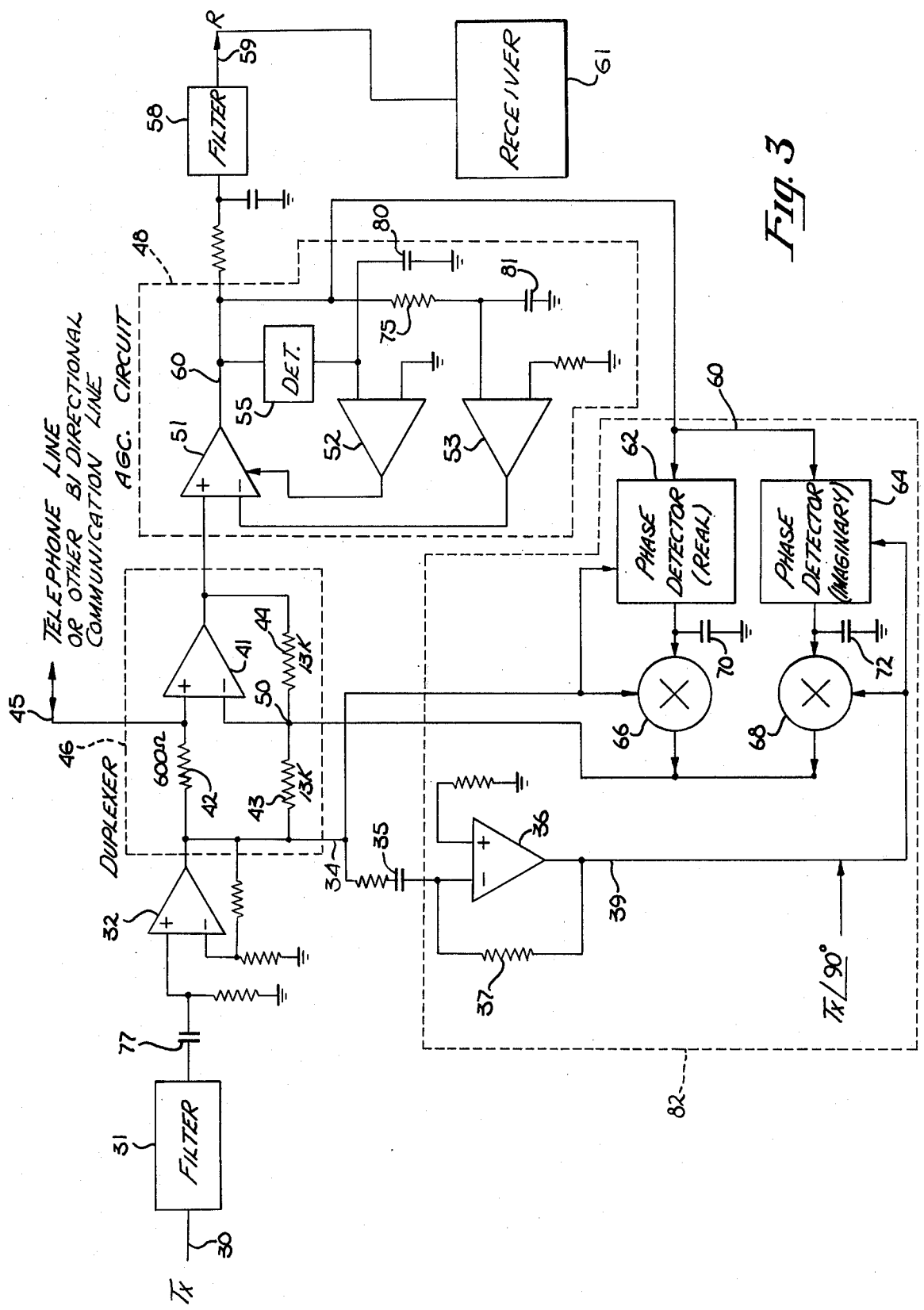
FIG. 3 is a circuit and block diagram illustrating the presently preferred embodiment of the invention.

Referring now to FIG. 3 and the presently preferred embodiment, the transmitted signal, line 30, is coupled to a duplexer (shown within dotted line 46) through the filter 31, capacitor 77, and buffer 32. The received signal from the duplexer is coupled to an automatic gain control (AGC) circuit shown within dotted line 48. The received signal after being coupled through an RC filter is connected to a filter 58 with the output of this filter (line 59) being coupled to a receiver 61. The filters 31 and 58, as discussed in the Prior Art Section of this application, may be used to prevent the transmitted signal from being sensed on line 59. However, to assure that substantially none of the transmitted signal is sensed on line 59, these bandpass filters must have precise characteristics and are typically quite expensive. In the presently preferred embodiment, relatively inexpensive filters (capacitive-switch filters) are used for filters 31 and 58. The present invention provides substantially better isolation through the duplexer making the more expensive filters unnecessary.

The duplexer again includes an amplifier 41 with the output coupled to the resistor 44. The inverting terminal of this amplifier receives the transmitted signal, after this signal is divided across the resistors 43 and 44. The bidirectional telephone line 45 is terminated in a pure resistive load 42, shown as 600 ohms.

While not necessary to practice the present invention, in the presently preferred embodiment, an AGC circuit is used to provide a more constant level of received signal. A voltage controlled amplifier 51 receives the output of the duplexer at its noninverting terminal. The output of the amplifier 51 (line 60) is connected to a detector 55. The output of this detector, after coupling through amplifier 52, controls the gain of the amplifier 51. Line 60 is also coupled through resistor 75 and amplifier 53 to provide a DC feedback signal to the inverting terminal of the amplifier 51. Line 60, which contains both the received signal and the residue of the transmitted signal, is coupled to the phase detectors 62 and 64. The detector 62 receives the transmitted signal from line 34. This signal is also coupled to the multiplier 66.

The transmitted signal from line 34 is capacitively coupled through capacitor 35 to the inverting input terminal of amplifier 36. The output of amplifier 36 is fed back through resistor 37 to this input terminal. The capacitor 35, along with the amplifier 36 and its feedback, effectively differentiate the transmitted signal on line 34, and thus provide a phase shift to the transmitted signal of approximately 90° (line 39). (Note a circuit which effectively integrates $T_x$ may be used since it also provides a phase shift of approximately 90°). The phase shifted signal on line 39 is connected to the detector 64 and also to the multiplier 68.

The output of the phase detectors 62 and 64 are connected to one input terminal of the multipliers 66 and 68, respectively. The DC signal from these detectors are smoothed by the capacitors 70 and 72. The outputs of the multipliers 66 and 68 are connected to the node 50. The current outputs of these multipliers are effectively summed at node 50. The current injected into node 50 is of the proper magnitude and phase to effectively null the transmit signal at node 60 for a wide range of resistive and reactive line mismatches.

Commercial components may be used to fabricate the entire circuit of FIG. 3. However, in the preferred embodiment, those portions of the circuit shown within dotted lines 48 and 82 have been realized as a custom integrated circuit, with the exception of the capacitors 70, 72, 80 and 81.

The operation of the phase detectors 60 and 64 may be best described with reference to specific examples. Assume that the signal applied to a detector from line 34 is $A_1 \cos \omega t$. ($A_1$ is substantially larger than $A_2$.) For this case, the DC output from the detector would be proportional to $A_2$. If the signal applied on line 39 is $A_1 \sin \omega t$ and the signal on line 60 is $-A_2 \sin \omega t$, then the DC output would be proportional to $-A_2$. If the signal applied on line 34 or 39 is $A_1 \sin \omega t$ and the signal applied on line 60 is $A_2 \cos \omega t$, then the output of the detector would be zero.

The phase detector 62, since its detection is based on an unshifted $T_x$ (line 34) effectively detects the real component of the residue of the transmitted signal on line 60. The detector 64, since its detection is based on $T_x$, shifted by $\pm 90°$, detects the imaginary component of the residue of the transmitted signal present on line 60.

The output of the detector 62 is used to modulate the amplitude of the unshifted transmitted signal by means of the multiplier 66. Similarly, the output of the detector 64 is used to modulate the amplitude of the 90° phase shifted transmitted signal by the multiplier 68. The current outputs of these multipliers are summed at node 50 with this output injected into the inverting terminal of the amplifier 41 in such a manner as to minimize the residual transmitted signal on line 60.

The detectors 62 and 64 synchronously detect the residue of $T_x$ present at the output of the duplexer. Since these detectors are driven in quadrature, the outputs of the detector represent the real and imaginary components of the residue signal. (The AGC circuit has little effect on this residue since the residue is typically much smaller than the received signal. The amplitude of this residue is in the linear portion of the AGC circuit for practical purposes.) The summed current signals from the multipliers 66 and 68 when injected into the feedback path of the duplexer operates to null the residue of the transmitted signal from the duplexer.

Thus, a circuit has been described which greatly enhances the performance of an isolation means such as a duplexer. The circuit provides compensation for variations in line impedance and effectively cancels the residue of the transmitted signal at the receiver. Unlike prior art circuits, the telephone line remains terminated in a fixed impedance. The circuit is particularly useful in modems since it eliminates the need for expensive bandpass filters.

I claim:

1. In a communications system employing an isolation means for isolating a transmitted signal from a received signal, a circuit for providing a control signal for said isolation means which reduces the magnitude of said transmitted signal at a receiver, comprising:
    phase detection means for detecting the real component and imaginary component of said transmitted signal at the output of said isolation means, said phase detection means coupled to receive said transmitted signal and coupled to said isolation means; and,
    modulation means for modulating said transmitted signal with said real and imaginary components from said phase detection means so as to provide said control signal, said modulation means coupled to receive said transmitted signal and coupled to said phase detection means and said isolation means;
    whereby a control signal is provided which substantially cancels said transmitted signal at said output of said isolation means.

2. The circuit defined by claim 1 wherein said modulation means modulates said transmitted signal with said real component and said transmitted signal shifted in phase with said imaginary component.

3. In a communications system employing a duplexer for isolating a transmitted signal from a received signal, said duplexer providing a constant termination impedance for the communication line, a circuit for providing a control signal for said duplexer which compensates for variations in line impedance, comprising:
    phase detection means for detecting the real component and imaginary component of said transmitted signal residue present at the receive output of said duplexer, said phase detection means coupled to receive said transmitted and phase shifted transmitted signal and coupled to said duplexer;
    modulation means for modulating said real and imaginary components of said transmitted and phase shifted transmitted signal from said phase detection means so as to provide said control signal, said modulation means coupled to receive said transmitted signal and coupled to said phase detection means and said duplexer;
    whereby said control signal provides compensation for variations in line impedance so as to substantially reduce said transmitted signal at said received output of said duplexer.

4. The circuit defined by claim 3 wherein said modulation means modulate said transmitted signal with said detected real component of said transmitted signal residue present at said receive output of said duplexer and said transmitted signal phase shifted by 90° by said detected imaginary component of said transmitted signal residue present at said receive output port of said duplexer.

5. The circuit defined by claim 4 wherein said phase detection means detects said imaginary component with said shifted transmitted signal.

6. The circuit defined by claim 5 wherein said control signal is injected into a feedback path in said duplexer.

7. In a telephone communications system employing an isolation means for isolating a transmitted signal from a received signal, a circuit for providing a control signal for said isolation means, comprising:
    phase shifting means for phase shifting said transmitted signal, coupled to receive said transmitted signal;
    first phase detection means for providing a first signal representative of the phase relationship between said transmitted signal and the transmitted signal residue at the output of said isolation means; said first phase detection means coupled to said isolation means;

second phase detection means for providing a second signal representative of the phase relationship between said phase shifted transmitted signal and said transmitted signal residue at the output of said isolation means, said second phase detection means coupled to said isolation means and said phase shifting means;

first modulating means for modulating said transmitted signal with said first signal from said first phase detection means, said first modulation means coupled to the output of said first phase detection means;

second modulation means for modulating said phase shifted transmitted signal with said second signal from said second phase detection means, said second modulation means coupled to the output of said second phase detection means and to said phase shifting means;

control signal generation means for providing a control signal to said isolation means, said control signal generation means coupled to receive the outputs of said first and second modulation means;

whereby the residue of said transmitted signal at the output of said isolation means is substantially cancelled by said control signal.

8. The circuit defined by claim 7 wherein said first and second modulation means are multipliers.

9. The circuit defined by claim 8 wherein said phase shifting means provide a 90° phase shift.

10. The circuit defined by claim 9 wherein an automatic gain control circuit is coupled at said output of said isolation means.

11. In a telephone communications system employing a duplexer for isolating a transmitted signal from a received signal, said duplexer providing a constant termination impedance for a telephone line, a circuit for providing a control signal for injection into a feedback loop of said duplexer to compensate for variations in line impedance, comprising:

phase shifting means for phase shifting said transmitted signal, coupled to receive said transmitted signal;

first phase detection means for providing a first signal representative of the phase relationship between said transmitted signal and said transmitted signal residue present at the receive output port of said duplexer, said first detection means coupled to said duplexer;

second phase detection means for providing a second signal representative of the phase relationship between said phase shifted transmitted signal and said transmitted signal residue present at said receive output port of said duplexer, said second detection means coupled to said duplexer and to said phase shifting means;

first modulation means for modulating said transmitted signal with said first signal from said first phase detector said first modulation means coupled to the output of said first phase detection means;

second modulation means for modulating said shifted transmitted signal with said second signal from said second phase detector, said second modulation means coupled to the output of said second phase detection means and to said phase shifting means;

the outputs of said first and second modulation means being coupled to said duplexer to provide said control signal;

whereby said residue of said transmitted signal is substantially cancelled by said control signal.

12. The circuit defined by claim 11 wherein said phase shifting means provides a phase shift of 90°.

13. The circuits defined by claim 12 wherein said first and second modulation means are multipliers.

14. In a communications system employing an isolation means for isolating a transmitted signal from a received signal, a circuit for providing a control signal for said isolation means which reduces the magnitude of said transmitted signal at the received signal output port, comprising:

phase detection means for detecting the real and imaginary components of said transmitted signal residue present at said received signal output port of said isolation means, said phase detection means coupled to receive at least two phases of said transmitted signal; and, modulation means for modulating said phases of said transmitted signal with said real and imaginary components, and for providing said control signal, said modulation means coupled to said phase detection means and to said isolation means;

whereby said control signal substantially cancels said transmitted signal residue at said received signal output port of said isolation means.

15. The circuit defined by claim 14 wherein said modulation means modulate said transmitted signal with said detected real component of said transmitted signal residue present at said received signal output port of said isolation means; and wherein said modulation means modulates said phase shifted transmitted signal with said detected imaginary component of said transmitted residue present at said received signal output port of said isolation means.

16. In a communications system employing a duplexing means for isolating the transmitted signal from the received signal, said duplexing means providing a constant termination impedance for the communication line, a method for generating a signal for said duplexing means to compensate for variations in line impedance, comprising the steps of:

determining the real and imaginary components of the apparent received signal from said duplexing means, based on the phase relationship of said transmitted signal residue present at the output port of said isolation means and said transmitted signal;

modulating said transmitted signal with said real and imaginary components;

controlling said duplexing means with modulated signal so as to substantially cancel the residue of said transmitted signal at said output port of said duplexing means;

whereby compensation is provided for the effects of line impedance variations.

17. The method defined by claim 16 including the step of shifting said transmitted signal by 90°, and wherein said shifted signal is used for said modulation of said imaginary component.

* * * * *